United States Patent
Domino et al.

(10) Patent No.: US 6,697,613 B1
(45) Date of Patent: Feb. 24, 2004

(54) SYSTEM FOR CANCELING INTERNAL INTERFERENCE IN A RECEIVER

(75) Inventors: William J. Domino, Yorba Linda, CA (US); Morten Damgaard, Laguna Hills, CA (US); Darioush Agahi-Kesheh, Irvine, CA (US); Arvind Arora, Laguna Niguel, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 442 days.

(21) Appl. No.: 09/634,081

(22) Filed: Aug. 8, 2000

(51) Int. Cl.[7] .......................... H04B 1/10; H04B 17/00; H03D 1/04; H03D 1/06; H03K 5/01; H03K 6/04

(52) U.S. Cl. .................... 455/310; 455/317; 455/226.1; 375/346

(58) Field of Search ........................... 455/226.1, 227, 455/296, 310, 317; 375/346

(56) References Cited

U.S. PATENT DOCUMENTS 6,226,271 B1 * 5/2001 Dent .......................... 370/252
6,259,752 B1 * 7/2001 Domino et al. ............. 375/346
6,373,909 B2 * 4/2002 Lindquist et al. ........... 375/346

* cited by examiner

Primary Examiner—Vivian Chin
Assistant Examiner—Yuwen Pan
(74) Attorney, Agent, or Firm—Mintz Levin Cohn Ferris Glovsky & Popeo, P.C.

(57) ABSTRACT

A system for reducing internal interference in a radio-frequency (RF) receiver includes providing a plurality of time slots within a frame where the receiver is configured to receive external RF signals during a receive time slot within the frame. Data is collected during a receive time slot of a frame, and a receive data value is calculated corresponding to the collected data. A predetermined portion of the data collected is inspected, and a bias data value is calculated. The bias value is attributable to interference signals caused by the internal interference. The bias data value is added to an accumulator, and over time, a running average of the bias data values is determined. A portion of the running average is subtracted from the sample stream of data to provide output data corresponding to the external RF signals absent the internal interference.

19 Claims, 3 Drawing Sheets

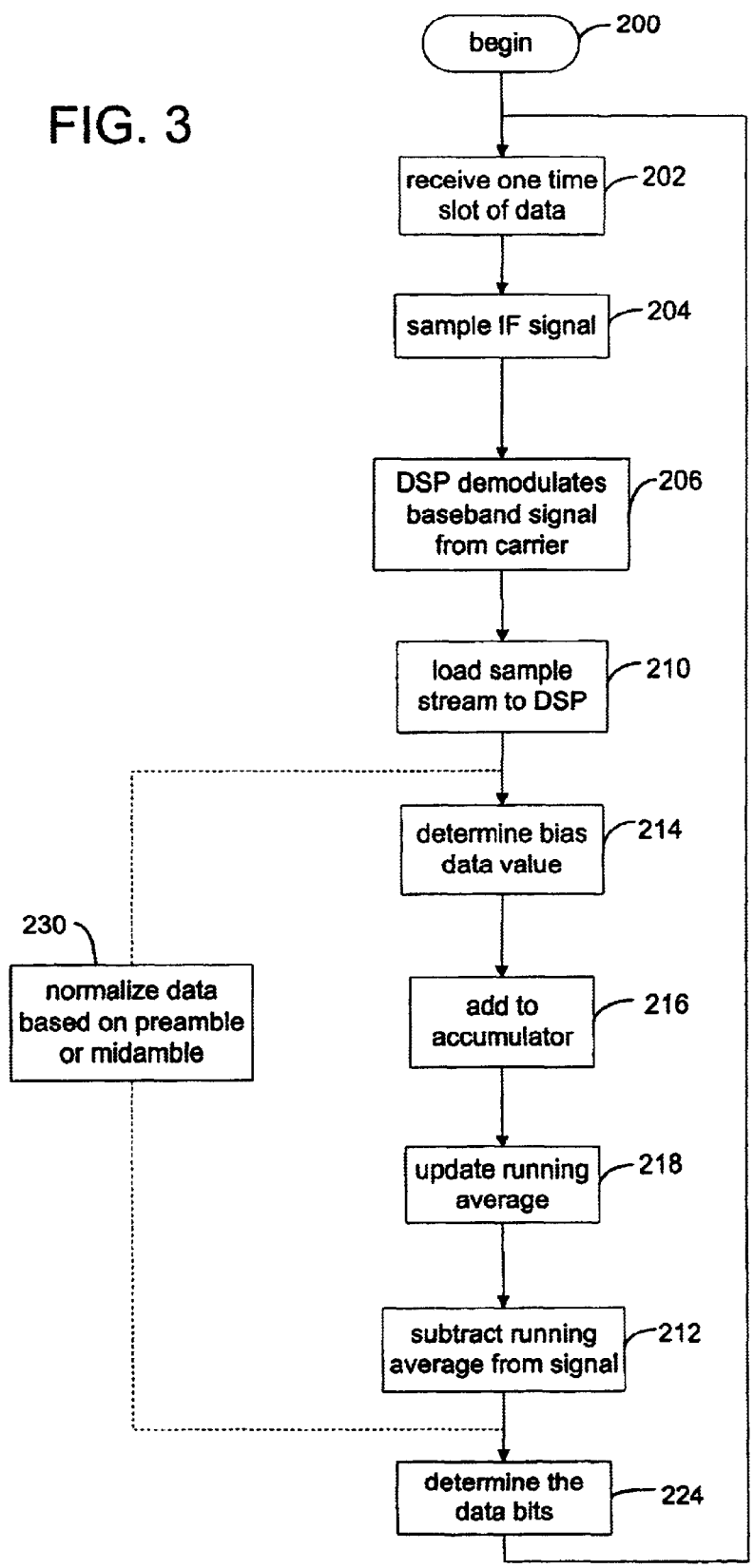

SYSTEM FOR CANCELING INTERNAL INTERFERENCE IN A RECEIVER

TECHNICAL FIELD

The invention relates to a system for canceling interference in a receiver and internal interference in a time-division multiple access (TDMA) receiver.

RELATED ART

Global System For Mobile ("GSM") receivers typically derive many different clock frequencies from a single reference frequency and are susceptible to "self-jamming" or interference at particular frequency channels. For example, it is common to use a crystal oscillator as a system clock operating at a frequency of either 13 MHz or 19.5 MHz because use of such frequencies permits other clock frequencies to be easily derived. A problem arises when a harmonic of the system clock is the same frequency as one of the GSM communication channels. For example, the $72^{nd}$ harmonic of a 13 MHz system clock has energy at 936 MHz (72*13=936). Channel of the GSM system is centered at 936 MHz. Thus, the harmonics produced by the system clock causes interference with GSM channel No. 5. Further, additional interference is caused by other harmonics that may not necessarily be generated by the system clock, but rather by other clocks in the system and by spurious mixes of local oscillators. In heterodyne or super-heterodyne receivers, local oscillators, mixers, and various digital clocks emit a wide range of harmonics that interfere with various GSM channels.

One approach to solve this problem in prior art systems is to add shielding to the "noisy" components of the system so that the harmonic energy does not substantially escape or enter the receiver circuitry. This involves using various metal enclosures and screens, and may include specialized printed circuit board design. This, however, adds significant weight and increases the size of the device. Because weight and size are extremely important considerations in the design of a GSM system, such as a cellular telephone, the disadvantages of this approach are apparent. Further, use of shielding increases the cost of the device, which is usually sold in a cost-competitive market. Other approaches use additional receiver data collections to take a "sample" of the interference during a time when the input to the receiver is blocked. The "interference data" is then quantified and subtracted from the subsequent data collections. This approach, however, is disadvantageous because additional data collections consume additional power.

SUMMARY

Reduction of internal interference in a radio-frequency (RF) receiver may be accomplished by collecting data during a predetermined receive time slot of a frame. A predetermined portion of the data collected is inspected, and a bias data value is calculated. The bias value is attributable to interference signals caused by the internal interference. The bias data value is accumulated, and over time, a running average of the bias data values is determined. A portion of the running average is subtracted from the sample stream of data to provide output data corresponding to the external RF signals absent the internal interference.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessary to scale, emphasis instead being placed upon illustrating the principals of the invention. Moreover, in the figures, like reference numerals designate corresponding parts throughout the different views.

FIG. 3 is a flowchart of a specific embodiment of a method for canceling internal interference.

DETAILED DESCRIPTION

Figure 1:
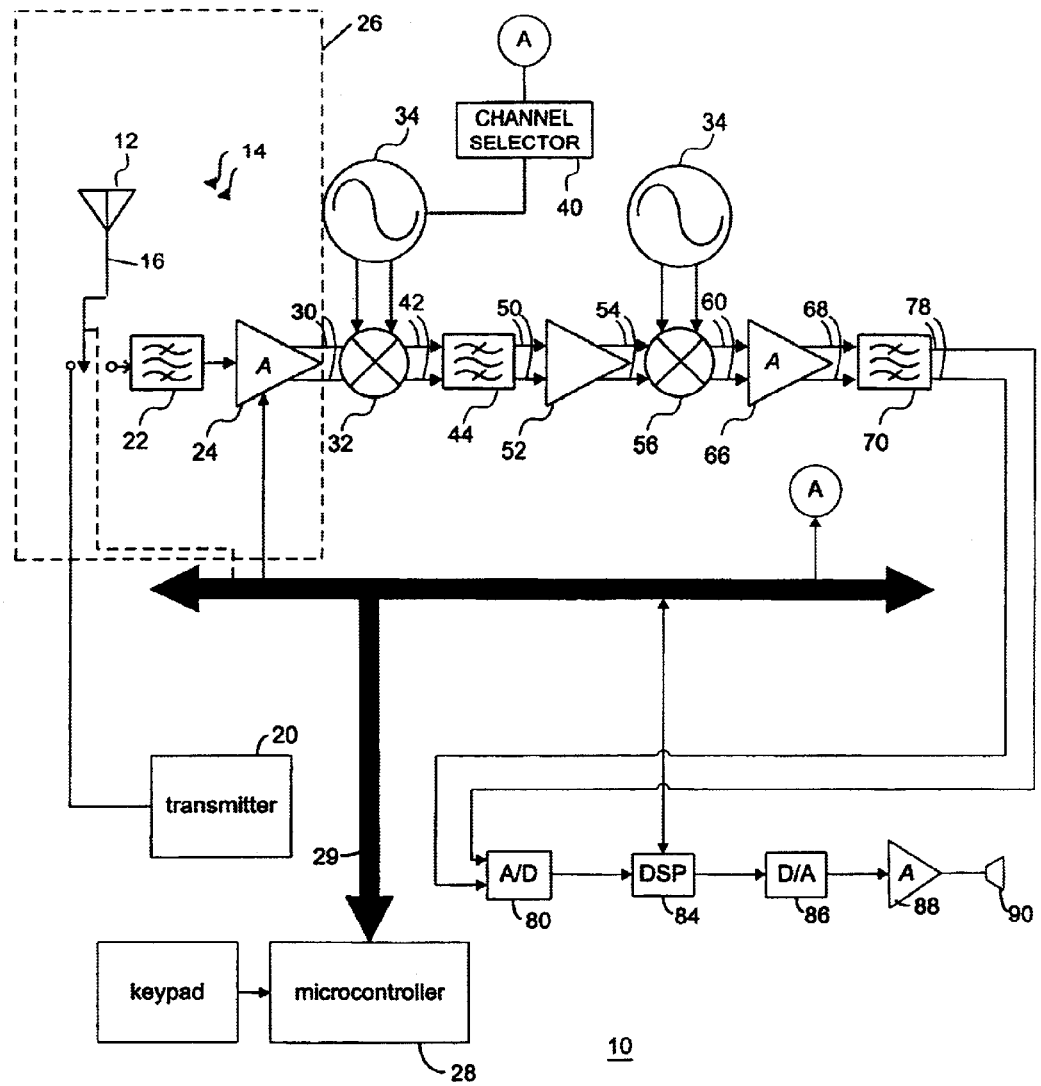
FIG. 1 is a schematic block diagram of a specific embodiment of a GSM receiver.

FIG. 1 is a specific embodiment of a GSM receiver 10 for use in a GSM communication system. Note that the inventive system may be used in many types of receivers and is particularly advantageous in TDMA type receivers (e.g., a GSM receiver, IS136 type receiver systems, etc.).

The GSM receiver 10 includes an antenna 12 for receiving GSM communication signals (radio frequency signals) 14. The antenna 12 is coupled to a switch 16, which is shown symbolically, for example, as a single-pole single-throw switch. The switch 16, however, may be for example, a FET (field effect transistor) switch or MOSFET (metal-oxide semiconductor FED) switch, or any suitable device capable of blocking or de-coupling a signal from its source. The switch 16 is used because the GSM receiver 10 utilizes a single antenna for receiving and transmitting signals. The switch 16 couples the antenna 12 to a transmitter block 20 or to an RF bandpass filter 22, depending upon its position, such that the GSM receiver 10 can be placed in either a "receive" mode or a "transmit" mode at any particular time. The filter 22 is coupled via the switch 16 to the antenna 12 when the GSM receiver 10 is in the receive mode of operation. The transmitter block 20 is shown in block diagram representation only.

The filter 22 filters the RF signals 14 or external signals received on the antenna 12 and passes only a band of frequencies occupied by specific communication channels used for the GSM communication system. The external signals 14 are typically the communication signals representing voice, data, or other information desired to be transmitted and/or received by a user. For example, for a typical GSM receiver, the filter 22 may have a pass-band frequency of 935 MHz to 960 MHz, which may provide appropriate bandwidth for 125 individual GSM communication channels or more. The filter 22 substantially eliminates or reduces interfering signals at frequencies above and below the frequencies used for the 125 GSM communication channels.

The output of the filter 22 is then amplified by an amplifier 24, which may be, for example, a front-end low-noise amplifier. The antenna 12, filter 22, and amplifier 24 may be part of a "front-end" 26 of the receiver 10. Also included in the front-end 26, but not specifically shown in FIG. 1, may be one or more attenuators.

A micro-controller or other processor 28 is preferably included to control various components in the GSM receiver 10 and is coupled to the various components by a bus 29, as is known in the art. The bus 29 is shown pictorially but may also include individual control lines and is not meant to be limited only to byte-wide data. The processor 28, may be, for example, a computer, processor, central processing unit (CPU), microprocessor, RISC (reduced instruction set computer), single chip computer, distributed processor, controller, micro-controller, discrete logic device, and the like.

In the embodiment of FIG. 1, the amplifier 24 produces an amplified signal on differential conductors 30, and is coupled to a main mixer 32, which then mixes the amplified signals 30 with an output of a differential oscillator 34. In some embodiments, the differential oscillator 34, may be, for example, a voltage-controlled oscillator (VCO), but need not be a differential VCO.

A channel selector 40 provides a tuning signal to the VCO 34, which permits the VCO to produce an output at a frequency corresponding to a desired GSM communication channel. The channel selector 40 is controlled by the processor 28. In the illustrated embodiment of FIG. 1, the GSM communication band may span twenty-five megahertz from 935 MHz to 960 MHz, which may include 125 GSM communication channels, each having a bandwidth of 200 KHz. To permit selection from among these GSM communication channels, the VCO 34 produces an output that is tunable in 200 KHz steps from 1335 MHz to 1360 MHz, such that the VCO can be tuned by the channel selector 40 to a frequency associated with any desired GSM channel of the 125 GSM communication channels. In this way, when the tuning signal output of the VCO 34 is mixed with the output of the amplifier 24 by the main mixer 32, a first mixed signal (IF signal) having a 200 KHz bandwidth is produced across a pair of differential output conductors 42 of the main mixer. The first mixed signal has a base frequency of 400 MHz (the difference between the frequency of the output of the VCO 34 and the frequency of the amplified signal on differential conductors 30) and contains the particular 200 KHz GSM communication channel selected by the channel selector 40.

In the embodiment of FIG. 1, the differential output of the main mixer 32 is routed to a first IF (intermediate frequency) filter 44, which passes only signals at IF. For example, the IF filter 44 may have a pass-band frequency of about 400 MHz and a bandwidth of about 200 KHz. The output of the IF filter 44 appears on differential conductors 50, which provides the IF signal to a second amplifier 52. The second amplifier 52 amplifies the IF signals to produce an amplified IF signal across a pair of differential conductors 54, which in turn, are coupled to an auxiliary mixer 56.

The auxiliary mixer 56 receives the IF signal and mixes it with a 385.4 MHz fixed-frequency signal produced by an auxiliary VCO 58, which may be, but need not necessarily be a differential VCO. The auxiliary mixer 56 further down-converts the amplified IF signal to a frequency of 14.6 MHz. The auxiliary mixer 56 produces further down-converted signals across a pair of differential output conductors 60, which in turn, are coupled to a third amplifier 66.

The third amplifier 66 amplifies the down-converted 14.6 MHz signal containing the selected GSM communication channel and passes it via a pair of differential output conductors 68 to a band-pass filter 70 having a substantially 200 KHz pass-band at 14.6 MHz. The filter 70 provides further suppression of unwanted frequencies and provides an output signal across a pair of differential output conductors 78, which is routed to an A/D converter 80, and is further processed by a digital-signal-processing (DSP) 84. The DSP 84 is also under processor 28 control, and data may be transferred between the DSP and the processor via the bus 29. As is known in the art, the DSP 84 samples the digital data at an appropriate sampling rate, for example, at a 19.5 MHz sample rate, and provides an output in the form of digital words, which are preferably sixteen bits in length. However, any suitable digital signal processor may be employed, which may use any suitable bit length format. After processing, the output of the DSP 84 is then converted back into analog form by a D/A converter 86, where it is then amplified by an output amplifier 88 and output to a speaker 90. As shown in the illustrated embodiment of FIG. 1, a super-heterodyne receiver may be used having two down-conversion stages. However, any suitable number of down-conversion stages may be used to provide appropriate tuning for the frequency range utilized.

Figure 2:
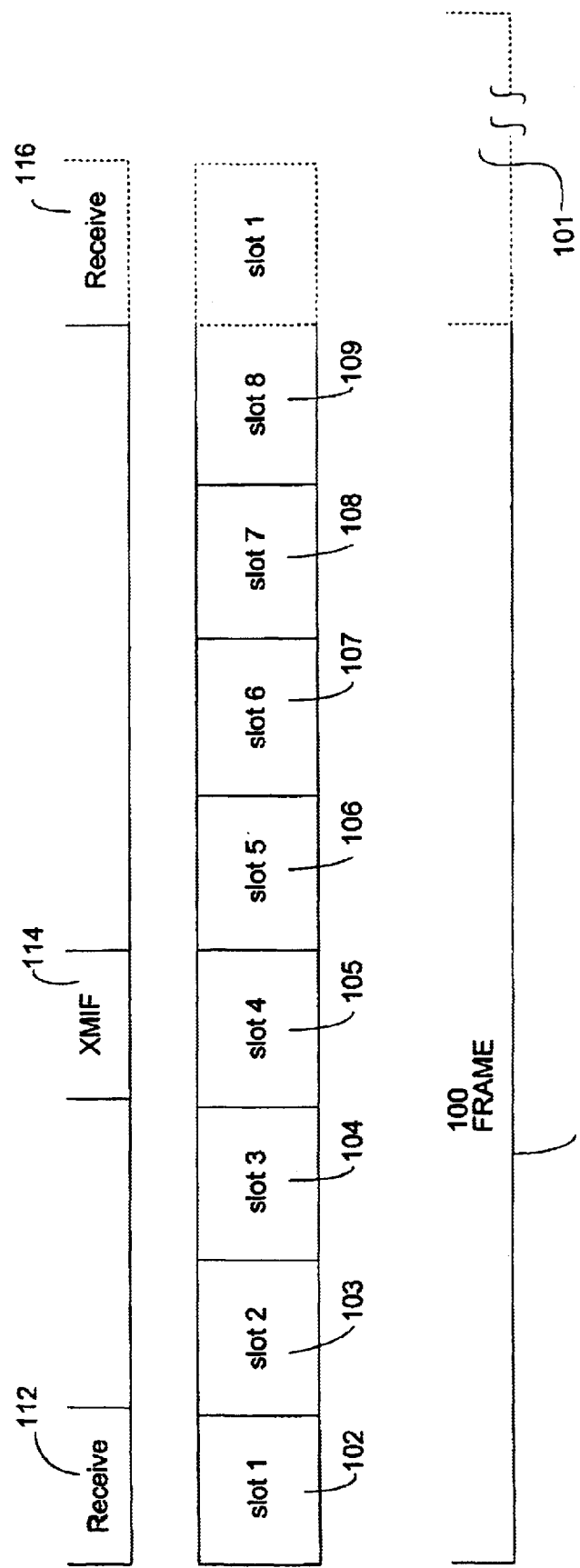
FIG. 2 is a pictorial representation of a specific embodiment of a time slot allocation scheme.

FIG. 2 illustrates an embodiment of a TDMA (time division, multiple access) timing scheme. Such timing schemes are applicable to receivers utilizing time-division multiple access formats. As shown in the example of FIG. 2, the frame 100 includes eight individual slots 102–109 of substantially equal duration. The frame 100 may be about 4.615 milliseconds in duration while each slot 102–109 may be about 576.875 microseconds in duration. The frame 100 continuously repeats to provide a uniform format to which all member GSM communication systems conform. A portion of a subsequent frame is labeled as 101. However, the frames 100 and 101 may be of any suitable duration and may include any suitable number of time slots within, and is not limited to the specific embodiment illustrated.

As is known in the art, time division multiplexing schemes permit greater bandwidth because a user receives and transmits only during specific time intervals within the frame 100. Thus, multiple users can be accommodated with a single frame. No information is lost because data transmitted and received during a particular slot is compressed and expanded, respectively. Thus, the time slot allocation appears transparent to the user. Accordingly, multiple GSM systems can operate in the same area (using a common cellular base station, not shown) using the same receive frequency without conflict because each GSM communication system (cellular telephone) is assigned one of the slots (e.g., one of the eight slots 102–109 shown in FIG. 2) in which to receive, and one of the slots in which to transmit. Note that the transmission frequency is different than the receive frequency. This essentially multiplies by eight the number of users that can share a single RF channel of one common cellular base station, whether receiving or transmitting.

In a GSM communication system, the receiver 10 of FIGS. 1 and 2 may receive RF signals 14 during a selected slot 102–109 within the frame 100. For example, the receiver 10 is designated to receive data during slot 102 (time slot 1), which is shown as a "receive slot" 112 in FIG. 2. Similarly, the transmitter may transmit data during one selected slot 102–109 within the frame 100. In the illustrated embodiment, the transmitter is designated to transmit during time slot 105 (time slot 4), which is shown as a "transmit slot" 114 in FIG. 2. The base station assigns and directs the slot allocation for each GSM communication device in communication with it. The frame format continuously repeats, and a receive time slot designated as 116 in dashed lines represents the next receive time slot in the subsequent frame 101. The receiver 10 receives only during one specific time slot within the frame 100 and transmits only during one specific time slot within the frame. However, the receiver 10 may be configured to receive or transmit during more than one time slot within the frame 100, of course, with an increase in data capacity.

In a typical GSM system, during each 4.615 milliseconds frame, data transmitted, such as voice information, is compressed so as to "fit" within the single 576.875 microseconds receive time slot 112. In practice, the 576.875 microsecond time slot includes a 31.106 microsecond guard band, thus only 542.769 microseconds remain for data reception and transmission. A voice signal is effectively compressed by a factor of eight-to-one relative to real-time voice, prior to transmission. The same ratio applies to data received, which of course, must be expanded. Such compression and expansion schemes are known in the art and are standardized in the GSM industry. Further, such standardized data transmission and reception standards use phase modulation of the carrier signal to encode the data, typically using Gaussian minimum shift keying (GMSK). Such phase modulation is not a data compression scheme.

Data received during the receive time slot 112 consists of 147 bits. Transmission or reception of 147 bits within the 576.875 microseconds receive time slot (542.769 effective time slot) implies an effective bit rate of 270.833 Kbits per second, as is known in the art. The 147 bits of data are sent and received as a packet or burst of data having a format governed by the GSM industry standard. In accordance with the GSM industry standard, the packet includes a midamble portion consisting of a fixed data value or pattern. Using the midamble data, the other data bits in the packet can be normalized to correct for phase and amplitude distortion, as will be described in greater detail later.

Internal interference may be caused by harmonics generated by the main system clock or by other digital clocks in the system. This results in bit errors within the DSP 84 that cause distortion and other undesirable effects. To reduce the undesirable effects caused by the internally generated interference, the receiver 10 essentially "subtracts" the components attributable to such interference from the data received such that the final output is substantially free of the signals caused by the internally generated interference.

This is based on the premise that over a given period of time, the sum of the digits, that is, the sum of the "ones" and "zeros" in a data string or burst, approaches zero. The longer the period of time, the closer the average converges to zero. This is due, in part, to the phase encoding scheme used to process the data. This assumes that the actual data transmitted and received varies greatly over time causing the phase-encoded digital representation of the data to essentially contain an equal number of ones and zeros.

Interference signals, such as internal interference, however, vary slowly over time relative to voice and other information. Such internal interference can exhibit a slow variation based on a temperature change of the components of the GSM receiver 10. As such, the sum of the digits attributable to internal interference in the data stream tend not to convergence toward zero. Rather, the digital data attributable to the internal interference causes the data received (or transmitted) to have a constant bias, or a "DC-like offset" value. Of course, for any single data burst, its instantaneous "bias value" ought not be subtracted from the value of the data, as that would essentially remove any "DC" data content from the data burst. Over the course of many bursts or many frames 100, a running average of the bias value due to the internal interference can be calculated and subtracted from the instantaneous value of the data collected during a single receive time slot 112.

This system may exhibit advantages over systems that perform specialized or additional data collections prior to the "main" data collection. Additional data collections may cause the GSM receiver to consume additional power that is at a premium in mobile communications systems. The system does not perform any additional data collections, other than the data collections scheduled to be performed during the receive time slot 112. The only burden to implement this invention is the additional data processing by the DSP 84, which is well-suited to perform this type of data processing.

FIG. 3 depicts a flowchart of the operation of the method for canceling internal interference. Processing begins at a block 200 and data is collected 202 for a single time slot 112 is received. Next, the IF signal is sampled 204 and the DSP 84 demodulates the base signal from the carrier 206. This leaves the baseband signal representing the "actual data," such as voice signals. Alternatively, the receiver of FIG. 1 may be configured to strip the baseband signal from the carrier before reaching the A/D converter 80, by mixing the signal down to baseband instead of using the second IF stage (56, 58).

In the illustrated embodiment, the 147 bits contained in each receive time slot 112 are not converted to an equal number of bits by the A/D converter. Rather, for each bit of the 147 bits received during the receive time slot 12, the A/D converter produces four samples at eight to sixteen bits per sample. This digitized sample stream 10 of data or "sample stream," essentially represents a digitized version of the analog data waveform, rather than a digital value representative of a voice data. The digitized sample stream is then routed to the DSP 84 for processing in a block 210.

A "bias data value" corresponding to a predetermined portion of the sample stream collected is determined 214. The predetermined portion of the sample stream, may be the entire sample stream, a preamble, or a midamble portion of the sample stream. In any case, the sample stream may contain the interference signals attributable to the internal interference.

In one embodiment, the bias data value may be the average, or DC component of the entire sample stream, which is then added to an accumulator 216. Then, a running average of the bias data values is calculated 218. The running average may be calculated by summing all of the bias data values and dividing by the number of such bias data values. This is an arithmetic mean. Between ten and two-hundred bias data values are stored and used to calculate the running average. Alternatively, FIFO (first-in-first-out) memory of a suitable size may be used so that the running average is essentially a "moving window." For example, a FIFO having 256 words, with each word being 147 bits wide would be suitable.

A portion of the running average may be subtracted from every sample in the sample stream 222 to provide output data corresponding to the external RF signals absent the internal interference. The DSP then processes the data received 224, so as to obtain a numerical value corresponding to the actual data. The data processed at this point may now contain substantially reduced interference signals. Next, control branches back to process the next data collection 202.

In another embodiment, the running average is not subtracted from the initial data collections. For example, if only a single data collection had been performed, and the average (one value) of the data was subtracted, the result would be zero. Thus, the information content could be lost.

Accordingly, several data collections are performed over several time slots before the running average is subtracted. In some embodiments, the running average, however, may be calculated beginning with the very first data collection, but is not subtracted from the sample stream for at least the first ten data collections. However, this number is not necessarily fixed and may vary (e.g., from five to fifty).

The entire value of the running average may be subtracted from the sample stream. Thus, the portion of the running average subtracted from the receive data value is one-hundred percent of the value of the running average. Alternatively, the portion of the running average subtracted may be less than one-hundred percent, and may for example, be eighty to one-hundred percent.

In an alternate embodiment, the steps 214, 216, 218, and 222 may be modified and combined as a step 230, shown in dashed lines in FIG. 3. In this embodiment, the midamble portion of the sample stream contains a specific data pattern that should be received as a known value absent internal interference. Alternatively, a preamble portion of the sample stream may be used. Because the internal interference may cause the value to be modified or "distorted," the sample stream may be "normalized" to essentially "reverse" the affects of the internal interference so that the specific data pattern is recovered.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed:

1. A method for reducing internal interference in a radio-frequency receiver configured to receive external RF signals during a predetermined receive time slot, the predetermined receive time slot having a preamble portion, a mid-amble portion and a third portion, comprising:

collecting a sample stream of data during the predetermined receive time slot, the sample stream of data including interference signals caused by the internal interference;

determining a bias data value for at least one of the preamble portion and the mid-amble portion of the collected data;

accumulating a plurality of bias data values;

calculating over time, a running average of the bias data values using said accumulated bias data values; and subtracting at least a portion of the running average from the sample stream of data corresponding to the third portion to provide output data corresponding to the external RF signals absent the internal interference.

2. The method according to claim 1, wherein the value of the running average is subtracted from the sample stream of data corresponding to the third portion only after accumulating at least ten bias data values.

3. The method according to claim 1, wherein the bias data value represents a DC offset in the sample stream of data.

4. The method according to claim 1, wherein the running average of the bias data values represent internal interference in the sample stream of data.

5. The method according to claim 1, wherein the sum of the sample stream of data collected over time, absent the interference signals, approaches zero.

6. The method according to claim 1, wherein the step of subtracting a portion of the running average includes the step of subtracting one-hundred percent of the value of the running average from the sample stream of data corresponding to the third portion.

7. The method according to claim 1, wherein the step of subtracting a portion of the running average includes the step of subtracting about between 80 percent to 100 percent of the value of the running average from the sample stream of data corresponding to the third portion.

8. The method according to claim 1, wherein the step of calculating the running average includes calculating an average of about between ten to two-hundred bias data values.

9. The apparatus according to claim 1, wherein the preamble or the mid-amble portions have a fixed data value or pattern.

10. A radio-frequency (RF) receiver apparatus configured to receive external RF signals during a predetermined receive time slot within a frame, the predetermined receive time slot having a preamble portion, a mid-amble portion and a third portion and having internal interference reduction comprising:

an antenna for receiving the external RF signals;

at least one down-converting circuit to down-convert the external RF signals to at least one of lower frequency signals and baseband signals;

an analog-to-digital converter to convert at least one of the lower frequency signals and baseband signals into digital signals, the digital signals including interference signals caused by internal interference;

a digital signal processor configured to process the digital signals representing data collected during the predetermined receive time slot, the digital signal processor sampling the data collected; and an accumulator accessible by the digital signal processor;

wherein the digital signal processor is configured to add to the accumulator a bias data value corresponding to the data collected corresponding to at least one of the preamble and the mid-amble portions, to calculate a running average of bias data values, and to subtract at least a portion of the running average from the data collected during the predetermined receive time slot that corresponds to the third portion to provide output data corresponding to the external RF signals absent the internal interference.

11. The apparatus according to claim 10, wherein the value of the running average is subtracted from the data collected during the predetermined receive time slot that corresponds to the third portion only after accumulating at least ten bias data values.

12. The apparatus according to claim 10, wherein the bias data value represents a DC offset in the data collected.

13. The apparatus according to claim 10, wherein the running average of the bias data values represent internal interference in the data collected.

14. The apparatus according to claim 10, wherein the sum of the data collected over time, absent the interference signals approaches zero.

15. The apparatus according to claim 10, wherein the step of subtracting a portion of the running average includes the step of subtracting one-hundred percent of the value of the running average from the data collected corresponding to the third portion.

16. The apparatus according to claim 10, wherein the step of subtracting a portion of the running average includes the step of subtracting about between 80 percent to 100 percent of the value of the running average from the data collected corresponding to the third portion.

17. The method according to claim 10, wherein the step of calculating the running average includes calculating an average of about between ten to two-hundred bias data values.

18. The method according to claim 1, wherein the preamble or the mid-amble portions have a fixed data value or pattern.

19. A radio-frequency (RF) receiver apparatus configured to receive external RF signals during a predetermined receive time slot within a frame, the predetermined receive time slot having a preamble portion, a mid-amble portion and a third portion and having internal interference reduction comprising:

means for down-converting the external RF signals to lower frequency signals;

means for converting the lower frequency signals to digital signals;

processing means for collecting data during the predetermined receive time slot and for sampling the data collected, the data collected including interference data caused by the internal interference; and means for accumulating data and accessible by the processing; and wherein the processing means is configured to add to the accumulating means a bias data value corresponding to the data collected corresponding to at least one of the preamble and the mid-amble portions, to calculate a running average of bias data values, and to subtract the running average from the data collected during the predetermined receive time slot corresponding to the third portion to provide output data corresponding to the external RF signals absent the internal interference.

* * * * *

UNITED STATES PATENT AND TRADEMARK OFFICE
CERTIFICATE OF CORRECTION

PATENT NO. : 6,697,613 B1
DATED : February 24, 2004
INVENTOR(S) : William J. Domino et al.

It is certified that error appears in the above-identified patent and that said Letters Patent is hereby corrected as shown below:

Column 10,
Line 6, delete "; and" and insert -- means; --.

Signed and Sealed this

Fifth Day of October, 2004

JON W. DUDAS
*Director of the United States Patent and Trademark Office*